(12) United States Patent
Cowley

(10) Patent No.: US 10,753,807 B2
(45) Date of Patent: Aug. 25, 2020

(54) THERMOCOUPLE TERMINATION/CLOSURE AND METHOD

(71) Applicant: TE Wire & Cable LLC, Saddle Brook, NJ (US)

(72) Inventor: Peter Cowley, Sheffield (GB)

(73) Assignee: TE Wire & Cable LLC, Saddle Brook, NJ (US)

( * ) Notice: Subject to any disclaimer, the term of this patent is extended or adjusted under 35 U.S.C. 154(b) by 219 days.

(21) Appl. No.: 15/875,144

(22) Filed: Jan. 19, 2018

(65) Prior Publication Data

US 2019/0226917 A1 Jul. 25, 2019

(51) Int. Cl.
| | | |
|---|---|---|
| *G01K 7/02* | (2006.01) | |
| *G01K 1/10* | (2006.01) | |
| *G01K 1/12* | (2006.01) | |
| *H01B 3/12* | (2006.01) | |
| *H01B 7/28* | (2006.01) | |
| *H01B 7/29* | (2006.01) | |

(52) U.S. Cl.
CPC ............... *G01K 1/10* (2013.01); *G01K 1/12* (2013.01); *G01K 7/02* (2013.01); *H01B 3/12* (2013.01); *H01B 7/28* (2013.01); *H01B 7/292* (2013.01)

(58) Field of Classification Search
CPC .............. G01K 7/02; G01K 1/08; G01K 7/06
See application file for complete search history.

(56) References Cited

U.S. PATENT DOCUMENTS

| | | | | | |
|---|---|---|---|---|---|
| 2,517,053 | A | * | 8/1950 | Thompson | G01K 7/04 136/229 |
| 3,499,217 | A | * | 3/1970 | Mochizuki | G01K 1/08 29/612 |
| 3,927,369 | A | * | 12/1975 | Billeter | G01K 5/52 324/642 |
| 4,087,693 | A | * | 5/1978 | Brown | G01K 7/04 250/390.01 |
| 4,430,518 | A | * | 2/1984 | Nakajima | G01K 1/105 136/234 |
| 4,724,428 | A | * | 2/1988 | Brown, Jr. | G01K 7/026 136/232 |
| 4,934,831 | A | * | 6/1990 | Volbrecht | G01K 1/08 29/612 |
| 4,984,904 | A | * | 1/1991 | Nakano | G01K 1/08 136/232 |

(Continued)

FOREIGN PATENT DOCUMENTS

| | | |
|---|---|---|
| CN | 1229189 A | 9/1999 |
| CN | 103180985 A | 6/2013 |

(Continued)

OTHER PUBLICATIONS

Jul. 18, 2018—(EP) EESR—App. No. 18153769.7-1001.

*Primary Examiner* — Gail Kaplan Verbitsky
(74) *Attorney, Agent, or Firm* — Banner & Witcoff, Ltd.

(57) ABSTRACT

Aspects of this disclosure relate to a methodology and process of hot junction formation and sheath closure for a dual-wall mineral insulated thermocouple cable. The new methods are required to maintain the integrity of both the inner and outer sheaths or inner and outer walls of a dual-walled thermocouple design. As the inner and outer sheaths are different materials, they may require closure separately with no mixing of the sheathing materials during welding.

13 Claims, 6 Drawing Sheets

(56) References Cited

U.S. PATENT DOCUMENTS

| | | | | | |
|---|---|---|---|---|---|
| 5,122,637 | A | * | 6/1992 | Bottorff | B23K 3/033 |
| | | | | | 219/229 |
| 5,161,894 | A | * | 11/1992 | Bourigault | G01K 7/18 |
| | | | | | 338/28 |
| 5,464,485 | A | * | 11/1995 | Hall, Jr. | G01K 7/06 |
| | | | | | 136/230 |
| 5,999,081 | A | * | 12/1999 | Hannigan | G01K 1/10 |
| | | | | | 338/229 |
| 6,059,453 | A | * | 5/2000 | Kempf | G01K 1/08 |
| | | | | | 374/139 |
| 6,280,083 | B2 | * | 8/2001 | Kita | G01K 1/125 |
| | | | | | 374/140 |
| 6,830,574 | B2 | * | 12/2004 | Heckele | A61B 17/8875 |
| | | | | | 606/104 |
| 8,100,583 | B2 | * | 1/2012 | Conner | C23C 16/4586 |
| | | | | | 136/230 |
| 10,168,328 | B2 | * | 1/2019 | Berka | C12C 1/6881 |
| 2010/0322286 | A1 | * | 12/2010 | Toyama | G01K 1/08 |
| | | | | | 374/179 |
| 2013/0243036 | A1 | * | 9/2013 | Scervini | H01L 35/20 |
| | | | | | 374/179 |
| 2013/0312485 | A1 | * | 11/2013 | Yonezu | G01D 11/30 |
| | | | | | 73/23.2 |
| 2017/0367749 | A1 | * | 12/2017 | Gelfand | A61B 18/1492 |
| 2019/0148035 | A1 | * | 5/2019 | Weber | H01B 13/224 |
| | | | | | 174/102 P |

FOREIGN PATENT DOCUMENTS

| | | | | |
|---|---|---|---|---|
| CN | 203191029 | U | | 9/2013 |
| EP | 1186870 | A1 | | 3/2002 |
| GB | 1102985 | | * | 10/1965 |
| GB | 1102965 | A | * 2/1968 | C07C 2/62 |
| JP | 2000-227363 | A | | 8/2000 |
| JP | 2002-13984 | A | | 1/2002 |
| JP | 2008-261686 | A | | 10/2008 |
| JP | 2008261686 | A | * | 10/2008 |
| JP | 02008261686 | A | * | 10/2008 |
| JP | 2013-527600 | A | | 6/2013 |
| JP | 2017-116360 | A | | 6/2017 |
| SU | 415512 | A | * | 9/1970 |

* cited by examiner

THERMOCOUPLE TERMINATION/CLOSURE AND METHOD

FIELD OF INVENTION

The invention relates to a thermocouple termination/closure and method, and in particular to a termination/closure of the dual-wall sheathing at a hot junction area of a thermocouple cable.

BACKGROUND

In conventional mineral insulated wall cables, the closure is required to provide a suitable seal against the outer environment and prevent ingress of materials and moisture. Dual-wall mineral insulated cables require the same closure or sealing of the outer sheathing or outer wall for the same reasons. In addition, the inner sheath or inner wall, which is made from a different material, is also required to be sealed to stop migration of elements and materials from the outer sheath or outer wall to the thermocouple wires. The new methods are required to maintain the integrity of both the inner and outer sheaths or inner and outer walls of the dual-walled cable design. As the inner and outer sheaths or inner and outer walls are different materials, they ideally require closure separately with, if possible, no mixing of the sheathing materials during welding.

The present invention solves the problem of ensuring both walls or sheathing material of a dual-wall mineral insulated cable are sealed or closed. When using the same methods as used with conventional mineral insulated dual wall cables, in operation and at temperature, the weld closures show faults and splitting or blowing open and exposing the inner MgO powder and breaking the seal. The splitting or blowing of the sheath closure weld is due to the mixing of the inner and outer sheathing materials during the welding process giving a weld or outer sheathing area of significantly different alloy, to that of the rest of the cable. Sealing the inner wall or the inner sheath will stop/reduce migration of elements from the outer wall or outer sheath. Sealing the outer wall or outer sheath will provide a continuous protection from the environment. Both sealing the inner wall and outer wall are important for the termination/closure of the sheathing at a hot junction area of a thermocouple cable.

SUMMARY

Aspects of this disclosure relate to a thermocouple cable, comprising: a first conductor and a second conductor, wherein the first conductor and the second conductor extend within a composite sheath; and an internal cap and an external cap positioned at an end of the thermocouple cable. The composite sheath may comprise a metal alloy outer sheath and a nickel-based inner sheath positioned between the first conductor and the second conductor and the metal alloy outer sheath. The internal cap and external cap may be positioned at the end of the thermocouple cable at a weld-closure area of the thermocouple cable. The first conductor and the second conductor may form a weld bead hot junction at the end of the thermocouple cable. The internal cap may be made from a same material as the inner sheath and the external cap may be made from a same material as the outer sheath. Additionally, the first conductor and the second conductor may be laser welded and the weld-closure area may be laser welded.

Additional aspects of this disclosure may relate to a thermocouple cable, comprising: a first conductor and a second conductor, wherein the first conductor and the second conductor extend within a composite sheath; and an external cap positioned at an end of the thermocouple cable. The composite sheath may comprise a metal alloy outer sheath and a nickel-based inner sheath positioned between the first conductor and the second conductor and the metal alloy outer sheath. The external cap may be positioned at the end of the thermocouple cable at a weld-closure area of the thermocouple cable. The first conductor and the second conductor may form a weld bead hot junction at the end of the thermocouple cable. The external cap may be made from a same material as the outer sheath.

Still other aspects of this disclosure may relate to a thermocouple cable, comprising: a first conductor and a second conductor, wherein the first conductor and the second conductor extend within a composite sheath; and a cap positioned at an end of the thermocouple cable. The composite sheath may comprise a metal alloy outer sheath and a nickel-based inner sheath positioned between the first conductor and the second conductor and the metal alloy outer sheath. The cap may be positioned at the end of the thermocouple cable at a weld-closure area of the thermocouple cable. The first conductor and the second conductor may form a weld bead hot junction at the end of the thermocouple cable. The cap may include an external portion matching an outer sheath material and an internal portion matching an inner sheath material.

Additional aspects of this disclosure may relate to a thermocouple cable, comprising: a first conductor and a second conductor, wherein the first conductor and the second conductor extend within a composite sheath; and a cold swaged sheath closure positioned at an end of the thermocouple cable. The composite sheath may comprise a metal alloy outer sheath and a nickel-based inner sheath positioned between the first conductor and the second conductor and the metal alloy outer sheath. The first conductor and the second conductor may form a weld bead hot junction at the end of the thermocouple cable. The cold swaged sheath closure may include a top half made from a same material as the outer sheath and a bottom half made from a same material as the inner sheath.

Further aspects of this disclosure may relate to a thermocouple cable, comprising: a first conductor and a second conductor, wherein the first conductor and the second conductor extend within a composite sheath and are laser welded; and a single pressed cap positioned at an end of the thermocouple cable at a weld-closure area of the thermocouple cable. The composite sheath may comprise a metal alloy outer sheath and a nickel-based inner sheath positioned between the first conductor and the second conductor and the metal alloy outer sheath. The first conductor and the second conductor may form a weld bead hot junction at the end of the thermocouple cable. The single pressed cap may include a top half made from a same material as the outer sheath and a bottom half made from a same material as the inner sheath. The weld-closure area may be laser welded.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views. The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

Aspects of this disclosure relate to a methodology and process of hot junction formation and sheath closure for a dual-wall mineral insulated thermocouple cable. The new methods are required to maintain the integrity of both the inner and outer sheaths or inner and outer walls of a dual-walled thermocouple design.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

FIGS. 1-6 illustrate a dual-walled thermocouple or cable. Generally, these thermocouples or cables comprise two conductors, a bead or junction of the two conductors, an inner sheath, an outer sheath, and an end cap. The thermocouples or cables may include other numbers of conductors, such as four with two pairs of thermocouples/conductors or duplex or six with three pairs of thermocouples/conductors or triplex. Each of the finished thermocouples or cables as illustrated in FIGS. 1-6 may have a cold junction termination. As illustrated in each of FIGS. 1-6, the thermocouple may be further defined by various dimensions. The cable may include a diameter, D. The cable may include a weld cap or closure thickness, W. The cable may also include a bead or junction distance that is defined as the location of the bead or junction from the end of the weld cap or closure, B. The cable may also include an insulation thickness, A, which is defined as the distance between the bead or junction from the inside of the weld cap or closure. The sizes and depths removed/drilled for the thermocouples or cables should be such to give a finished product where a hot junction depth and overall wall thickness and hot junction location meet the requirements of IEC 1515.

Figure 1:
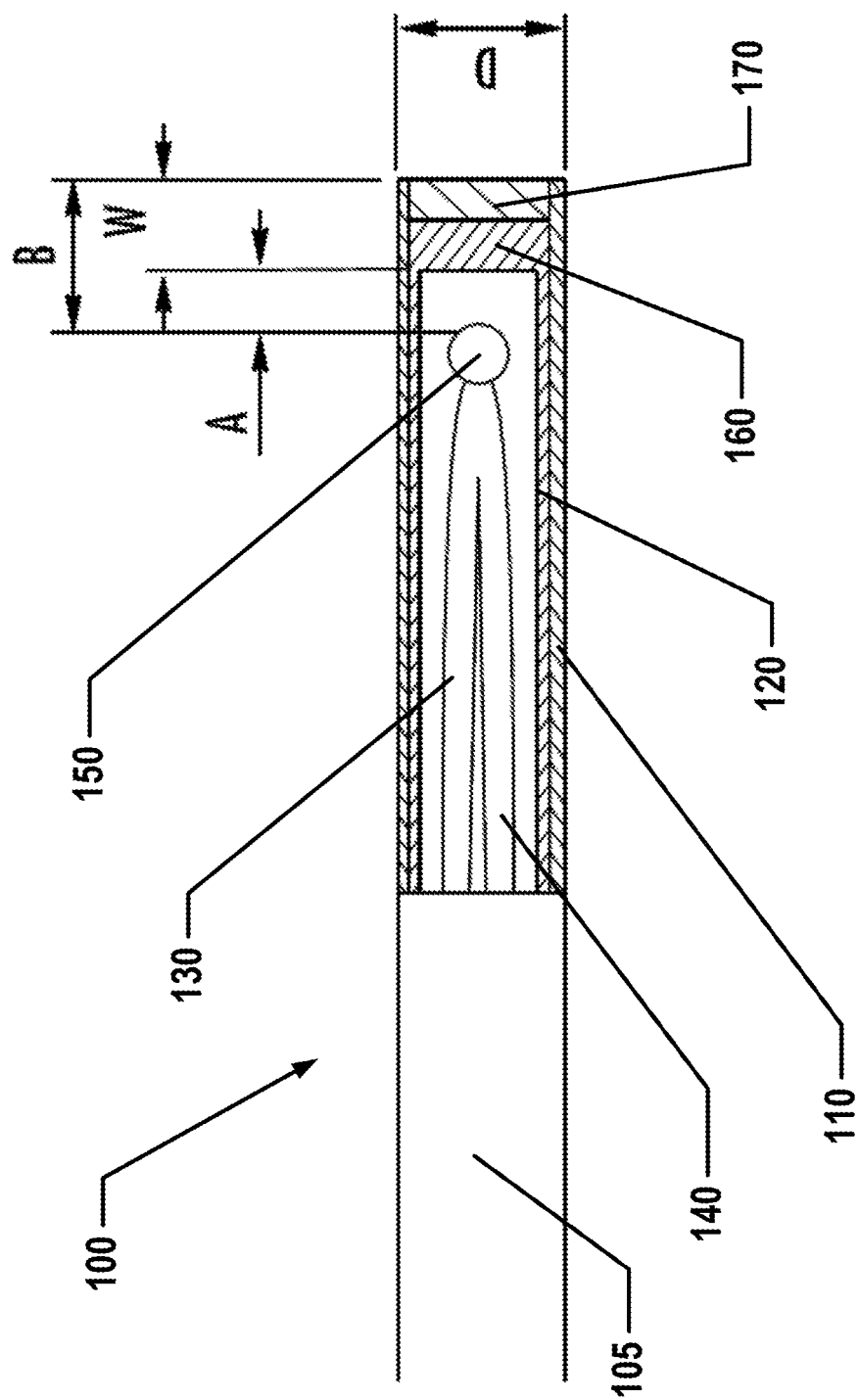
FIG. 1 illustrates a schematic longitudinal section of a thermocouple according to a first embodiment of the invention, schematically showing the end portion of the thermocouple, with a dual cap with the conductors capacitance welded and the closure is TIG welded.

FIG. 1 illustrates a schematic longitudinal section of a thermocouple 100 according to a first embodiment, schematically showing an end portion of the thermocouple 100 and specifically a hot end closure and junction formation for a dual-walled mineral insulated thermocouple cable 100. The thermocouple 100 may comprise two conductors 130, 140 extending within a composite sheath 105. As stated above, four or six conductors may be utilized within the thermocouple 100 without departing from this invention. The conductors 130, 140 may be similar to a conventional thermocouple, such as a Type K or Type N thermocouple. Along the length of the thermocouple 100, the conductors 130, 140 may be insulated from each other and from the inner surface of the sheath 105 by an insulating ceramic material, in the same way as in a conventional thermocouple.

The composite sheath 105 may be tubular and comprise an outer sheath 110 and an inner sheath 120. The term "sheath" may interchanged with "wall" also throughout this description, such as outer wall 110 and inner wall 120. The outer sheath 110 may be of a conventional oxidation-resistant alloy such as Inconel 600, but may be of any conventional environment-resisting alloy. Additionally, the outer sheath 110 may be an exotic metal or non-standard metal sheathings. The inner sheath 120 may be of a nickel-based alloy, but may be any of the nickel-based compositions known and used in the art. The thermocouple 100 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 100 may be as per a convention mineral insulated cable, by drilling down the inner conductors 130, 140 and removing the insulation powder. Additionally, the inner wall or inner sheath 120 may be removed to the cap depth. Then, the conductors 130, 140 will have a hot junction bead welding 150 along with partial insulation powder packing as per normal hot junction formation processing. Specifically, FIG. 1 discloses the use of an internal cap 160 and an external cap 170 at the weld closure area at the tip of the thermocouple 100. The internal cap 160 and the external cap 170 will be of the required size to fit in the dual-walled mineral insulated cable 100. The internal cap 160 may be made from the same material as the inner sheath or inner wall 120. The external cap 170 may be made from the same material as the outer sheath or outer wall 110. The internal cap 160 and the external cap 170 may then be inserted or placed in the dual-walled mineral insulated cable 100. A weld closure will then be conducted as per normal methods to complete the hot end sheath closure of the thermocouple 100 with the internal cap 160 and the external cap 170. Below is a summary of dimensions as outlined in FIG. 1 for the internal cap 160 and the external cap 170 and the dual-walled mineral insulated cable 100.

| Dimensions | Magnitude |
| --- | --- |
| D - Diameter of the cable 100 | D |
| A - Insulation thickness | Min - 0.05D |
| W - Weld cap thickness | Min - 0.1D |
| | Max - 0.8D |
| B - Bead position | Min - 0.15D |
| | Max - 1.5D |

For FIG. 1 - Measuring Junction Details as per IEC1515.

Figure 2:
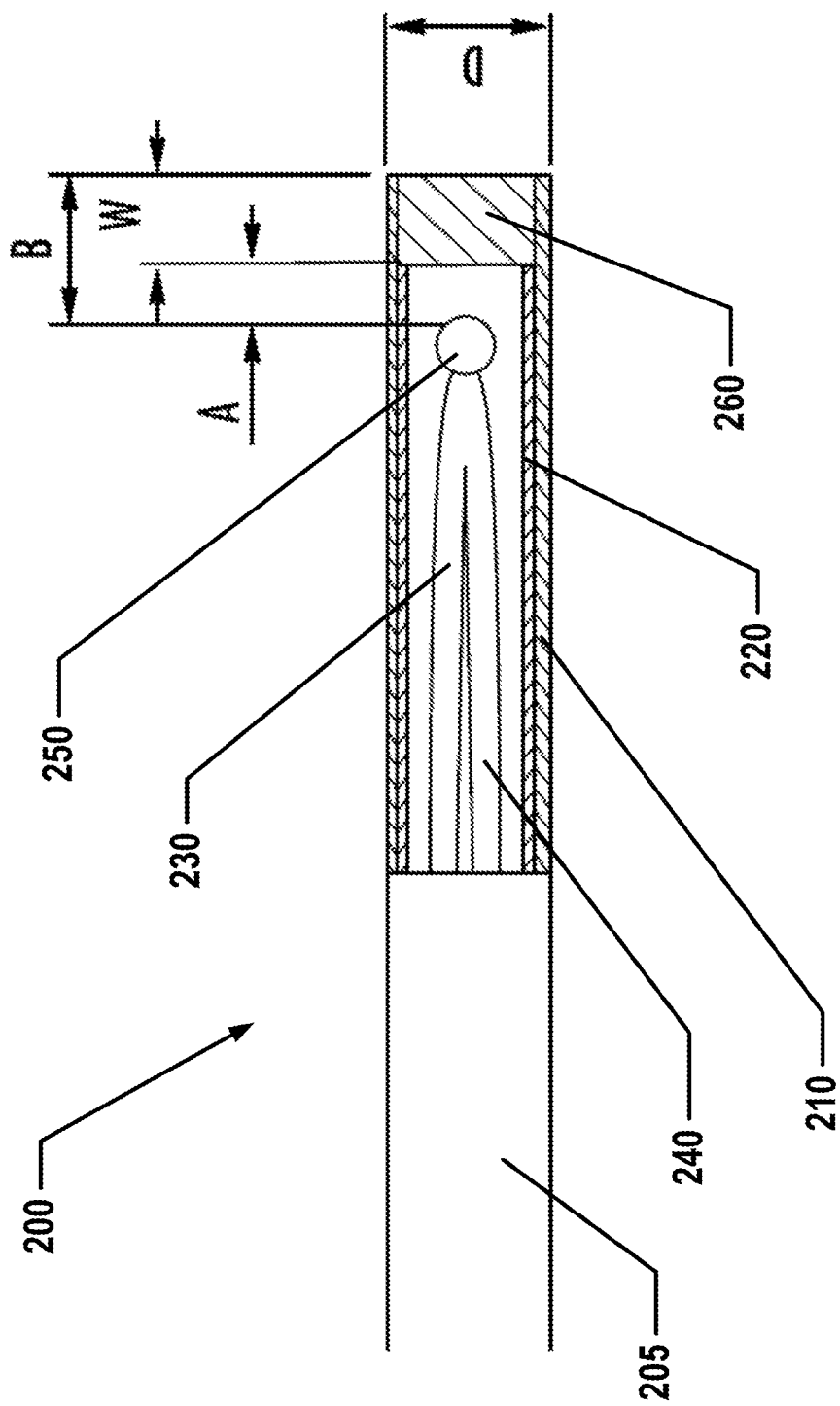
FIG. 2 illustrates a schematic longitudinal section of a thermocouple according to a second embodiment of the invention, schematically showing the end portion of the thermocouple, with a single cap with the conductors capacitance welded and the closure is TIG welded.

FIG. 2 illustrates a schematic longitudinal section of a thermocouple 200 according to a second embodiment, schematically showing an end portion of the thermocouple 200 and specifically a hot end closure and junction formation for a dual-walled mineral insulated thermocouple cable 200. The thermocouple 200 may comprise two conductors 230, 240 extending within a composite sheath 205. As stated above, four or six conductors may be utilized within the thermocouple 200 without departing from this invention. The conductors 230, 240 may be similar to a conventional thermocouple, such as a Type K or Type N thermocouple. Along the length of the thermocouple 200, the conductors 230, 240 may be insulated from each other and from the inner surface of the sheath 205 by an insulating ceramic material, in the same way as in a conventional thermocouple.

The composite sheath 205 may be tubular and comprise an outer sheath 210 and an inner sheath 220. The term "sheath" may interchanged with "wall" also throughout this description, such as outer wall 210 and inner wall 220. The outer sheath 210 may be of a conventional oxidation-resistant alloy, but may be of any conventional environment-resisting alloy. Additionally, the outer sheath 210 may be an exotic metal or non-standard metal sheathings. The inner sheath 220 may be of a nickel-based alloy, but may be any of the nickel-based compositions known and used in the art. The thermocouple 200 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 200 may be as per a convention mineral insulated cable, by drilling down the inner conductors 230, 240 and removing the insulation powder. Additionally, the inner wall or inner sheath 220 may be removed to the cap depth. Then, the conductors 230, 240 will have a hot junction bead welding 250 along with partial insulation powder packing as per normal hot junction formation processing. Specifically, FIG. 2 discloses the use of a single external cap 260 at the weld closure. The external cap 260 will be of the required size to fit in the dual-walled mineral insulated cable 200. The external cap 260 may be made from the same material as the outer sheath or outer wall 210. The external cap 260 may then be inserted or placed in the dual-walled mineral insulated cable 200. A weld closure will then be conducted as per normal methods to complete the hot end sheath closure with the single external cap 260. Below is a summary of dimensions as outlined in FIG. 2 for the external cap 260 and the dual-walled mineral insulated cable 200.

| Dimensions | Magnitude |
| --- | --- |
| D - Diameter of the cable 200 | D |
| A - Insulation thickness | Min - 0.05D |
| W - Weld cap thickness | Min - 0.1D |
| | Max - 0.8D |
| B - Bead position | Min - 0.15D |
| | Max - 1.5D |

For FIG. 2 - Measuring Junction Details as per IEC1515

Figure 3:
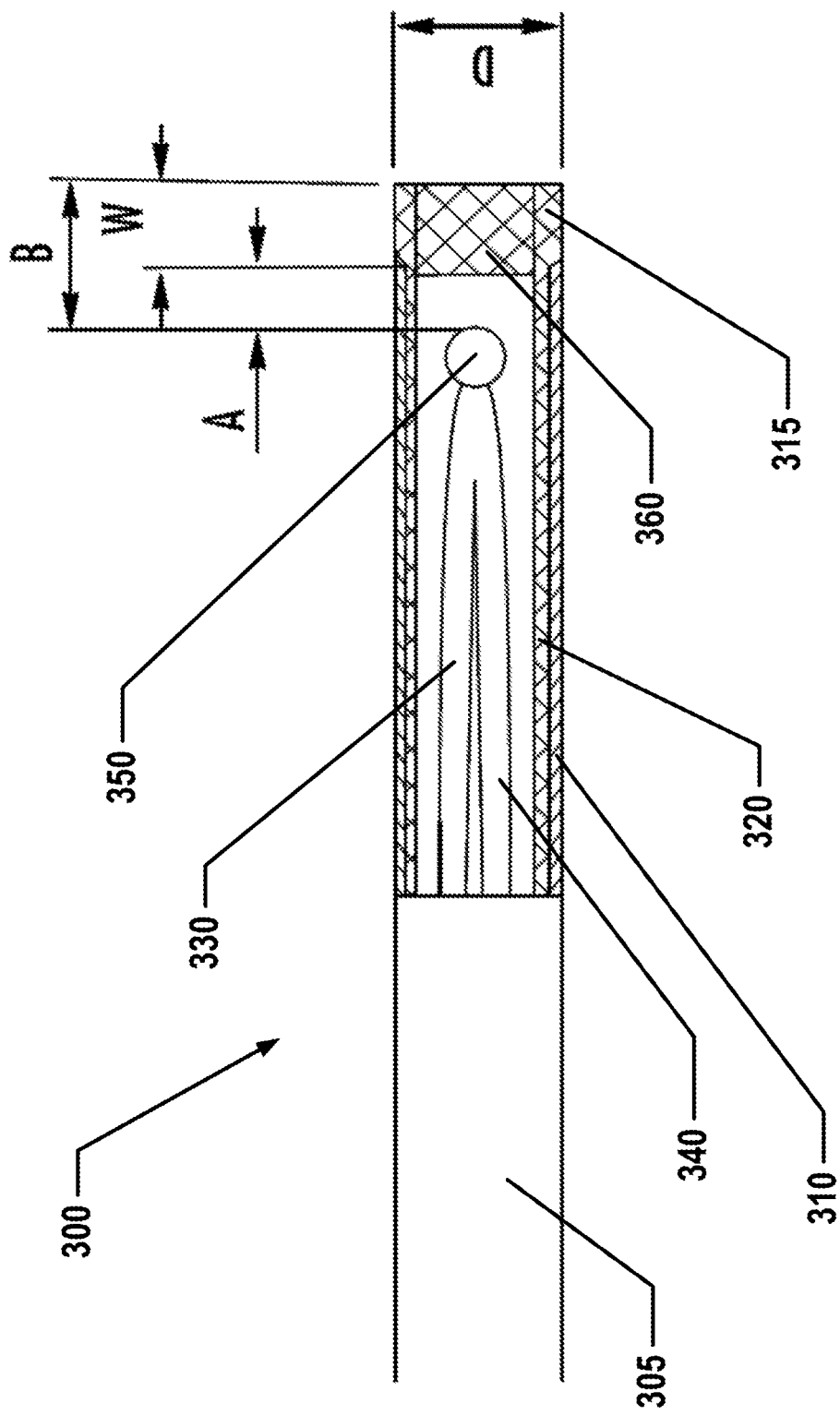
FIG. 3 illustrates a schematic longitudinal section of a thermocouple according to a third embodiment of the invention, schematically showing the end portion of the thermocouple, with a single cap that will mix with the inner/outer wall during the weld process.

FIG. 3 illustrates a schematic longitudinal section of a thermocouple 300 according to a third embodiment, schematically showing an end portion of the thermocouple 300 and specifically a hot end closure and junction formation for a dual-walled mineral insulated thermocouple cable 300. The thermocouple 300 may comprise two conductors 330, 340 extending within a composite sheath 305. As stated above, four or six conductors may be utilized within the thermocouple 300 without departing from this invention. The conductors 330, 340 may be similar to a conventional thermocouple, such as a Type K or Type N thermocouple. Along the length of the thermocouple 300, the conductors 330, 340 may be insulated from each other and from the inner surface of the sheath 305 by an insulating ceramic material, in the same way as in a conventional thermocouple.

The composite sheath 305 may be tubular and comprise an outer sheath 310 and an inner sheath 320. The term "sheath" may interchanged with "wall" also throughout this description, such as outer wall 310 and inner wall 320. The outer sheath 310 may be of a conventional oxidation-resistant alloy, but may be of any conventional environment-resisting alloy. Additionally, the outer sheath 310 may be an exotic metal or non-standard metal sheathings. The inner sheath 320 may be of a nickel-based alloy, but may be any of the nickel-based compositions known and used in the art. The thermocouple 300 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 300 may be as per a convention mineral insulated cable, by drilling down the inner conductors 330, 340 and removing the insulation powder. Then, the conductors 330, 340 will have a hot junction bead welding 350 along with partial insulation powder packing as per normal hot junction formation processing. Specifically, FIG. 3 discloses the use of a single cap 360 at the weld closure. The single cap 360 will be of the required size to fit in the dual-walled mineral insulated cable 300. The cap 360 may be made from the same material as the outer sheath 310. The cap 360 of the required size may be made from the same material as the inner sheath 320 and the outer sheath 310, (with the top half of the cap 360 matching the outer sheath 310 composition and bottom half of the cap 360 matching the inner sheath 320 composition). The cap 360 may then be placed in the dual-walled mineral insulated cable 300. A weld closure will then be conducted as per normal methods to complete the hot end sheath closure of the thermocouple 300 with the cap 360. The cap 360 may mix with the outer sheath 310 and the inner sheath 320 during the weld process. Below is a summary of dimensions as outlined in FIG. 3 for the cap 360 and the dual-walled mineral insulated cable 300.

| Dimensions | Magnitude |
| --- | --- |
| D - Diameter of the cable 300 | D |
| A - Insulation thickness | Min - 0.05D |
| W - Weld cap thickness | Min - 0.1D |
|  | Max - 0.8D |
| B - Bead position | Min - 0.15D |
|  | Max - 1.5D |

For FIG. 3 - Measuring Junction Details as per IEC1515.

Figure 4:
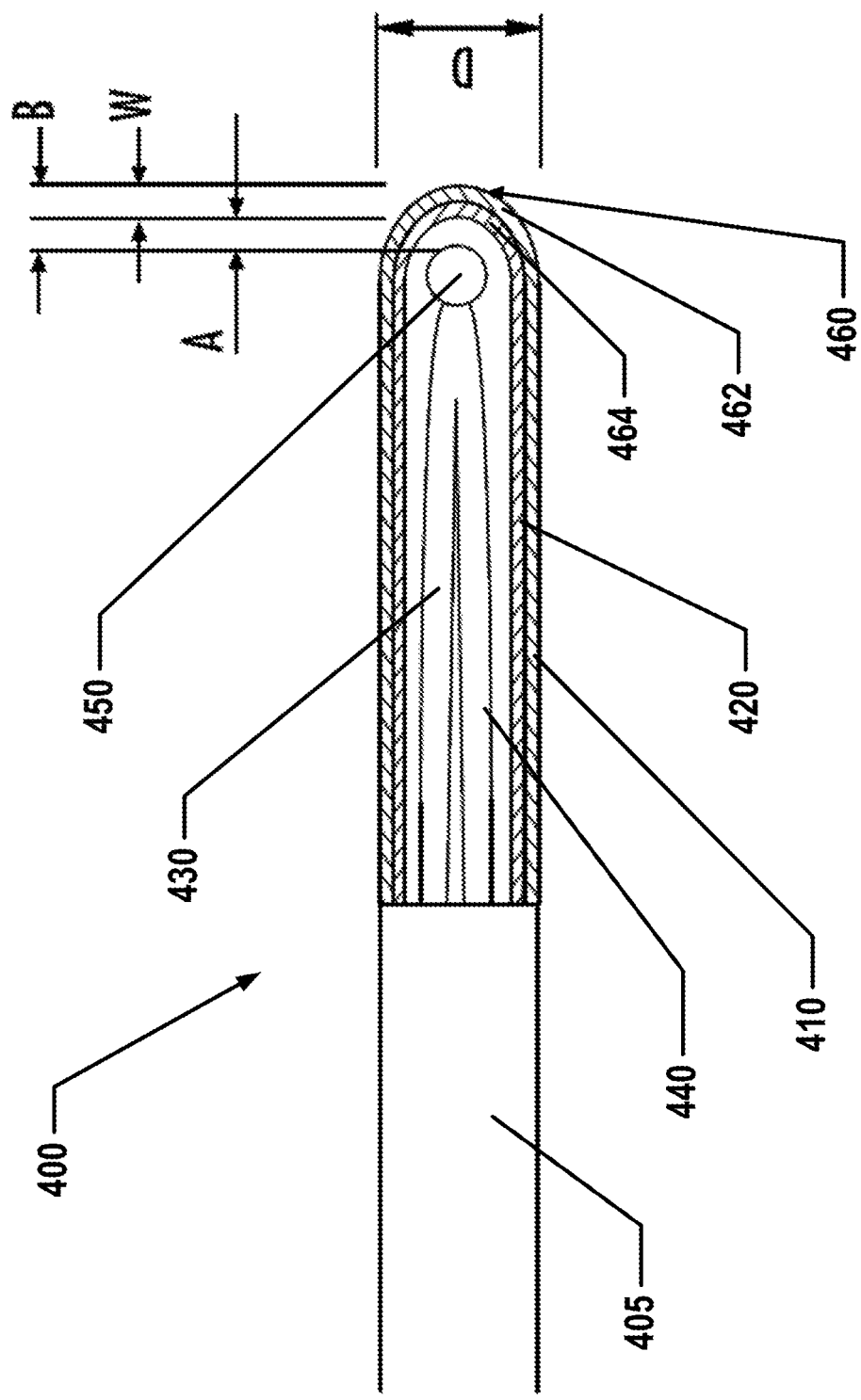
FIG. 4 illustrates a schematic longitudinal section of a thermocouple according to a fourth embodiment of the invention, schematically showing the end portion of the thermocouple, with a cold swaged closure with the conductors capacitance welded.

FIG. 4 illustrates a schematic longitudinal section of a thermocouple 400 according to a fourth embodiment, schematically showing an end portion of the thermocouple 400 and specifically a hot end closure and junction formation for a dual-walled mineral insulated thermocouple cable 400. The thermocouple 400 may comprise two conductors 430, 440 extending within a composite sheath 405. As stated above, four or six conductors may be utilized within the thermocouple 400 without departing from this invention. The conductors 430, 440 may be similar to a conventional thermocouple, such as a Type K or Type N thermocouple. Along the length of the thermocouple 400, the conductors 430, 440 may be insulated from each other and from the inner surface of the sheath 405 by an insulating ceramic material, in the same way as in a conventional thermocouple.

The composite sheath 405 may be tubular and comprise an outer sheath 410 and an inner sheath 420. The term "sheath" may interchanged with "wall" also throughout this description, such as outer wall 410 and inner wall 420. The outer sheath 410 may be of a conventional oxidation-resistant alloy, but may be of any conventional environment-resisting alloy. Additionally, the outer sheath 410 may be an exotic metal or non-standard metal sheathings. The inner sheath 420 may be of a nickel-based alloy, but may be any of the nickel-based compositions known and used in the art. The thermocouple 400 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 400 may be as per a convention mineral insulated cable, by drilling down the inner conductors 430, 440 and removing the insulation powder. The conductors 430, 440 will have a hot junction bead welding 450 along with partial insulation powder packing as per normal hot junction formation processing. Specifically, FIG. 4 discloses a cold swaged sheath closure 460 with conductors 430, 440 that are capacitance welded. The sheath closure 460 may be conducted by cold swaging the sheath with no additional materials being employed to conduct the sheath closure 460. The cold swaged closure 460 may require a sealing weld to the outer sheath 410 to maintain an air tight seal using either TIG or laser weld process. The sheath closure 460 will be made from the same material as the outer sheath 410 and the inner sheath 420 and, with a top half 462 of the sheath closure 460 matching the outer sheath 410 material and a bottom half 464 of the sheath closure 460 matching the inner sheath 420 material. Below is a summary of dimensions as outlined in FIG. 4 for the sheath closure 460 and the dual-walled mineral insulated cable 400.

| Dimensions | Magnitude |
| --- | --- |
| D - Diameter of the cable 400 | D |
| A - Insulation thickness | Min - 0.05D |
| W - Weld cap thickness | Min - 0.1D |
|  | Max - 0.8D |
| B - Bead position | Min - 0.15D |
|  | Max - 1.5D |

For FIG. 4 - Measuring Junction Details as per IEC1515.

Figure 5:
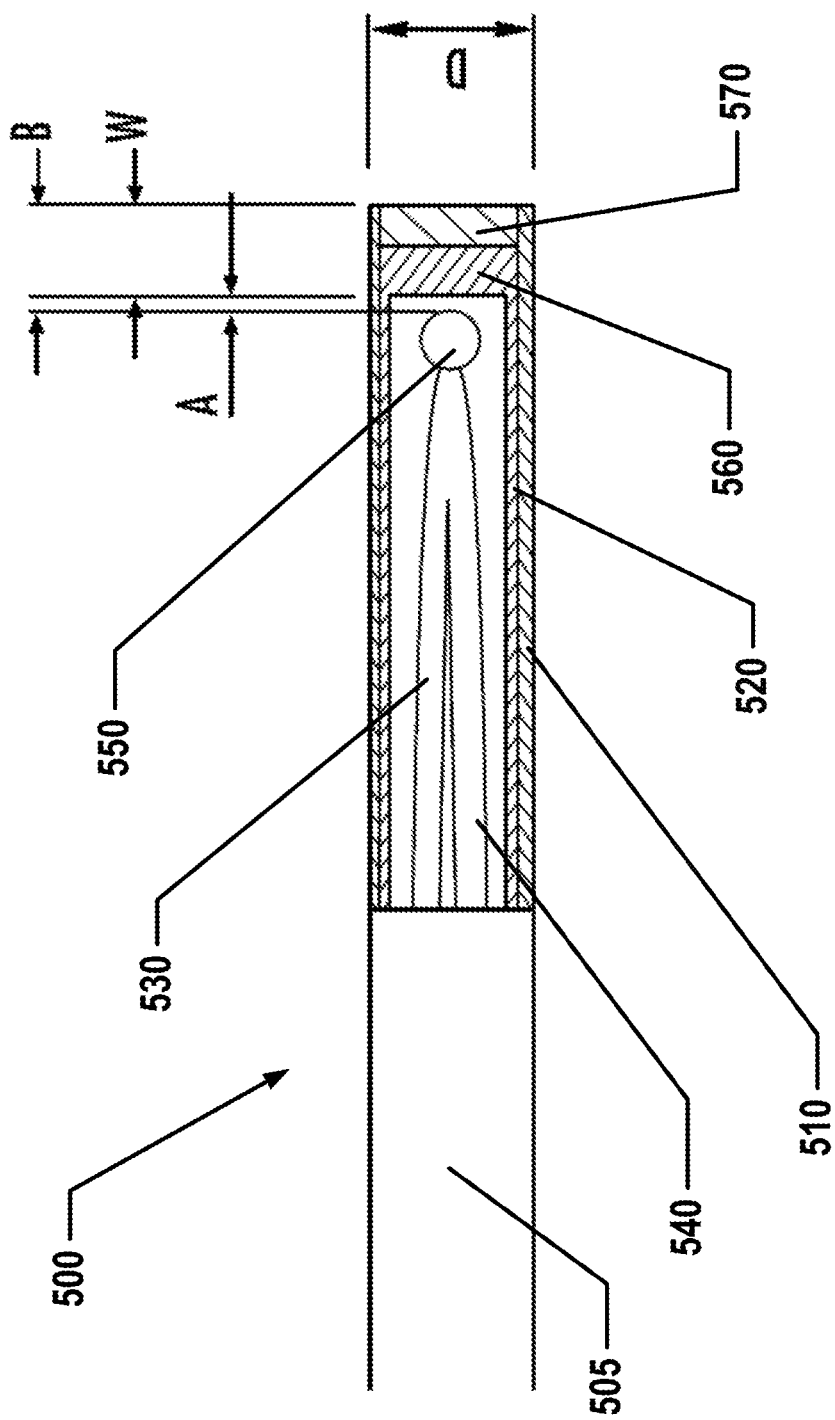
FIG. 5 illustrates a schematic longitudinal section of a thermocouple according to a fifth embodiment of the invention, schematically showing the end portion of the thermocouple, with a sleeved and dual cap with the conductors and closure laser welded.

FIG. 5 illustrates a schematic longitudinal section of a thermocouple 500 according to a third embodiment, schematically showing an end portion of the thermocouple 500 and specifically a hot end closure and junction formation for a dual-walled mineral insulated thermocouple cable 500. The thermocouple 500 may comprise two conductors 530, 540 extending within a composite sheath 505. As stated above, four or six conductors may be utilized within the thermocouple 500 without departing from this invention. The conductors 530, 540 may be similar to a conventional thermocouple, such as a Type K or Type N thermocouple. Along the length of the thermocouple 500, the conductors 530, 540 may be insulated from each other and from the inner surface of the sheath 505 by an insulating ceramic material, in the same way as in a conventional thermocouple.

The composite sheath 505 may be tubular and comprise an outer sheath 510 and an inner sheath 520. The term "sheath" may interchanged with "wall" also throughout this description, such as outer wall 510 and inner wall 520. The outer sheath 510 may be of a conventional oxidation-resistant alloy, but may be of any conventional environment-resisting alloy. Additionally, the outer sheath 510 may be an exotic metal or non-standard metal sheathings. The inner sheath 520 may be of a nickel-based alloy, but may be any of the nickel-based compositions known and used in the art. The thermocouple 500 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 500 may be as per a convention mineral insulated cable, by drilling down the inner conductors 530, 540 and removing the insulation powder. Additionally, the outer wall or outer sheath 510 may be removed to an internal cap depth leaving the inner sheath 520 exposed to the internal cap depth. Then, the conductors 530, 540 will have a hot junction bead welding 550 along with partial insulation powder packing as per normal hot junction formation processing. Specifically, FIG. 5 discloses the use of a sleeved and dual cap with an internal cap 560 and an external cap 570 at the weld closure area at the tip of the thermocouple 500. The external cap 570 of the outer sheath material in the form of a tube, longer than the removed length of the outer sheath 510, will be sleeved over the open area. Using a laser welder, the tube and the external cap 570 will be welded to the cable 500. The internal cap 560 and the external cap 570 will be of the required size to fit in the dual-walled mineral insulated cable 500. The internal cap 560 may be made from the same material as the inner sheath or inner wall 520. The external cap 570 may be made from the same material as the outer sheath or outer wall 510. The internal cap 560 and external cap 570 may also be pressed caps of two different materials without departing from this invention. The internal cap 560 and the external cap 570 may then be inserted or placed in the dual-walled mineral insulated cable 500. A laser-welded closure will then be conducted to complete the hot end sheath closure of the thermocouple 500 with the internal cap 560 and the external cap 570. The internal cap 560 may be welded to the inner sheath 520. The external cap 570 may be welded to the outer sheath 510 and be of the same material as the external cap 570 and the outer sheath 510. The external cap 570 may then slide over the inner sheath 520 to butt up to or be adjacent to the outer sheath 510 and then butt welded in place using the laser weld process. Below is a summary of dimensions as outlined in FIG. 5 for the internal cap 560 and the external cap 570 and the dual-walled mineral insulated cable 500.

| Dimensions | Magnitude |
|---|---|
| D - Diameter of the cable 500 | D |
| A - Insulation thickness | Min - 0.05D |
| W - Weld cap thickness | Min - 0.1D |
|  | Max - 0.8D |
| B - Bead position | Min - 0.15D |
|  | Max - 1.5D |

For FIG. 5 - Measuring Junction Details as per IEC1515.

Figure 6:
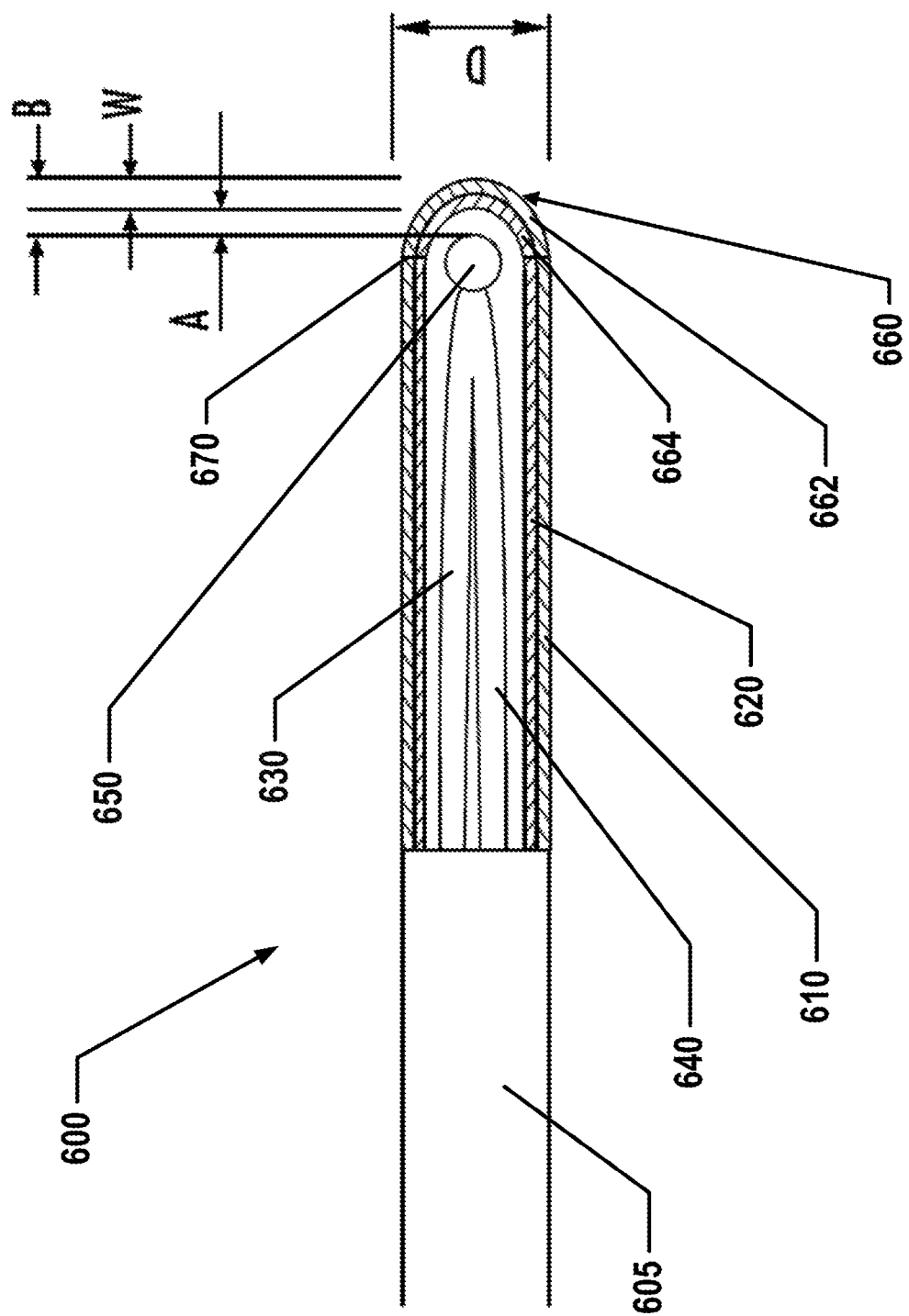
FIG. 6 illustrates a schematic longitudinal section of a thermocouple according to a sixth embodiment of the invention, schematically showing the end portion of the thermocouple, with a pressed cap with the conductors and closure laser welded.

FIG. 6 illustrates a schematic longitudinal section of a thermocouple 600 according to a third embodiment, schematically showing an end portion of the thermocouple 600 and specifically a hot end closure and junction formation for a dual-walled mineral insulated thermocouple cable 600. The thermocouple 600 may comprise two conductors 630, 640 extending within a composite sheath 605. As stated above, four or six conductors may be utilized within the thermocouple 600 without departing from this invention. The conductors 630, 640 may be similar to a conventional thermocouple, such as a Type K or Type N thermocouple. Along the length of the thermocouple 600, the conductors 630, 640 may be insulated from each other and from the inner surface of the sheath 605 by an insulating ceramic material, in the same way as in a conventional thermocouple.

The composite sheath 605 may be tubular and comprise an outer sheath 610 and an inner sheath 620. The term "sheath" may interchanged with "wall" also throughout this description, such as outer wall 610 and inner wall 620. The outer sheath 610 may be of a conventional oxidation-resistant alloy, but may be of any conventional environment-resisting alloy. Additionally, the outer sheath 610 may be an exotic metal or non-standard metal sheathings. The inner sheath 620 may be of a nickel-based alloy, but may be any of the nickel-based compositions known and used in the art. The thermocouple 600 may be intended for operation at elevated temperatures, such as above 1000° C. where these thermocouples made from this design may show a significant improvement in performance above this temperature. However, this design may also be advantageous at lower temperature ranges, such as 300 to 800° C.

The preparation of the dual-walled mineral insulated thermocouple or cable 600 may be as per a convention mineral insulated cable, by drilling down the inner conductors 630, 640 and removing the insulation powder. The conductors 630, 640 will have a hot junction bead welding 650 along with partial insulation powder packing as per normal hot junction formation processing. Specifically, FIG. 6 discloses a single pressed cap 660 with the closure and conductors 630, 640 that are laser welded. The pressed cap 660 will be of the required size and may then be inserted or placed in the dual-walled mineral insulated cable 600. The pressed cap 660 may be made from the same material as the outer sheath 610 and the inner sheath 620, with a top half 662 of the pressed cap 660 matching the outer sheath 610 material and a bottom half 664 of the pressed cap 660 matching the inner sheath 620 material. A laser-welded closure 670 will then be conducted to complete the hot end sheath closure of the thermocouple 600 with the pressed cap 660. Additionally, a method may be utilized to grind away or remove the outer sheath 610 for the process as described in FIG. 6. Below is a summary of dimensions as outlined in FIG. 6 for the pressed cap 660 and the dual-walled mineral insulated cable 600.

| Dimensions | Magnitude |
|---|---|
| D - Diameter of the cable 600 | D |
| A - Insulation thickness | Min - 0.05D |
| W - Weld cap thickness | Min - 0.1D |
|  | Max - 0.8D |
| B - Bead position | Min - 0.15D |
|  | Max - 1.5D |

For FIG. 6 - Measuring Junction Details as per IEC1515.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

I claim:

1. A thermocouple cable, comprising:
a first conductor and a second conductor, wherein the first conductor and the second conductor extend within a composite sheath;
the composite sheath comprising a metal alloy outer sheath and a nickel-based inner sheath positioned between the first conductor and the second conductor and the metal alloy outer sheath, wherein the nickel-based inner sheath is provided in contact with the metal alloy outer sheath along an extending direction of the first conductor and the second conductor; and
an external cap positioned at an end of the thermocouple cable at a hot junction weld at an end of the thermocouple cable,
wherein the first conductor and the second conductor form the hot junction weld at the end of the thermocouple cable, and further wherein the external cap is in contact with the end of the nickel-based inner sheath, and is welded to the metal alloy outer sheath with a same material as the metal alloy outer sheath and inserted in the metal alloy outer sheath at the hot junction weld.

2. The thermocouple cable according to claim 1, wherein the first conductor and the second conductor are insulated from each other and from an inner surface of the composite sheath by an insulating ceramic material.

3. The thermocouple cable according to claim 1, wherein the metal alloy outer sheath is made of a conventional oxidation-resistant alloy.

4. The thermocouple cable according to claim 1, wherein the metal alloy outer sheath is made of an environmental-resisting alloy.

5. The thermocouple cable according to claim 1, wherein the external cap is sized to fit in the thermocouple cable.

6. A thermocouple cable, comprising:
   a first conductor and a second conductor, wherein the first conductor and the second conductor extend within a composite sheath;
   the composite sheath comprising a metal alloy outer sheath and a nickel-based inner sheath positioned between the first conductor and the second conductor and the metal alloy outer sheath, wherein the nickel-based inner sheath is provided in contact with the metal alloy outer sheath along an extending direction of the first conductor and the second conductor; and
   a sheath closure cold swaged and positioned at an end of the thermocouple cable,
   wherein the first conductor and the second conductor form a weld bead hot junction at the end of the thermocouple cable, and further wherein the sheath closure includes a top half made from a same material as the outer sheath and made in a curved sectional shape protruding to an outside by the sheath closure, and a bottom half made from a same material as the inner sheath and made in a curved sectional shape protruding to the outside by the sheath closure along an inside of the top half.

7. The thermocouple cable according to claim 6, wherein the first conductor and the second conductor are insulated from each other and from an inner surface of the composite sheath by an insulating ceramic material.

8. The thermocouple cable according to claim 6, wherein the metal alloy outer sheath is made of a conventional oxidation-resistant alloy.

9. The thermocouple cable according to claim 6, wherein the metal alloy outer sheath is made of an environmental-resisting alloy.

10. A thermocouple cable, comprising:
    a first conductor and a second conductor, wherein the first conductor and the second conductor extend within a composite sheath and are laser welded;
    the composite sheath comprising a metal alloy outer sheath and a nickel-based inner sheath positioned between the first conductor and the second conductor and the metal alloy outer sheath, wherein the nickel-based inner sheath is provided in contact with the metal alloy outer sheath along an extending direction of the first conductor and the second conductor; and
    a single cap that is pressed and positioned at an end of the thermocouple cable at a hot junction weld at an end of the thermocouple cable,
    wherein the first conductor and the second conductor form the hot junction weld at the end of the thermocouple cable, and further wherein the single cap includes a top half made from a same material as the outer sheath and made in a curved sectional shape protruding to an outside by the composite sheath, and a bottom half made from a same material as the nickel-based inner sheath and made in a curved sectional shape protruding to the outside by the composite sheath along an inside of the top half, and further wherein the hot junction weld is laser welded.

11. The thermocouple cable according to claim 10, wherein the first conductor and the second conductor are insulated from each other and from an inner surface of the composite sheath by an insulating ceramic material.

12. The thermocouple cable according to claim 10, wherein the metal alloy outer sheath is made of a conventional oxidation-resistant alloy.

13. The thermocouple cable according to claim 10, wherein the metal alloy outer sheath is made of an environmental-resisting alloy.

* * * * *